United States Patent
Liu

(10) Patent No.: US 11,451,151 B1
(45) Date of Patent: Sep. 20, 2022

(54) HYBRID POWER CONVERSION SYSTEM AND CONTROL METHOD

(71) Applicant: Halo Microelectronics International, Campbell, CA (US)

(72) Inventor: Thomas Liu, Fremont, CA (US)

(73) Assignee: Halo Microelectronics International, Campbell, CA (US)

(*) Notice: Subject to any disclaimer, the term of this patent is extended or adjusted under 35 U.S.C. 154(b) by 0 days.

(21) Appl. No.: 17/326,503

(22) Filed: May 21, 2021

(51) Int. Cl.
*H02M 3/158* (2006.01)
*H02M 1/00* (2006.01)
*H02M 3/07* (2006.01)

(52) U.S. Cl.
CPC ....... *H02M 3/1584* (2013.01); *H02M 1/0095* (2021.05); *H02M 3/07* (2013.01)

(58) Field of Classification Search
CPC ..... H02M 3/07; H02M 3/1584; H02M 1/0095
See application file for complete search history.

(56) References Cited

U.S. PATENT DOCUMENTS

| | | | | |
|---|---|---|---|---|
| 7,397,299 B2* | 7/2008 | Ki | ........................ | H02M 3/073 327/536 |
| 8,860,396 B2* | 10/2014 | Giuliano | ............. | H02M 1/4225 323/288 |
| 2017/0244318 A1* | 8/2017 | Giuliano | ................. | H02M 1/42 |
| 2019/0372457 A1* | 12/2019 | Zhang | .................... | H02M 1/42 |
| 2020/0212704 A1* | 7/2020 | Eftimie | ................... | H02J 50/10 |

* cited by examiner

*Primary Examiner* — Jue Zhang
(74) *Attorney, Agent, or Firm* — Slater Matsil, LLP

(57) ABSTRACT

A hybrid dual-phase step-up power conversion system includes a first leg including a first switch, a second switch and a third switch connected in series between an output terminal of the hybrid dual-phase step-up power conversion system and ground, a second leg including a fourth switch, a fifth switch and a sixth switch connected in series between the output terminal of the hybrid dual-phase step-up power conversion system and ground, and a first capacitor and a second capacitor cross-coupled between the first leg and the second leg, wherein switches of the first leg and switches of the second leg are configured such that a sum of a voltage across the first capacitor and a voltage across the second capacitor is fed into the output terminal of the hybrid dual-phase step-up power conversion system.

20 Claims, 11 Drawing Sheets

HYBRID POWER CONVERSION SYSTEM AND CONTROL METHOD

TECHNICAL FIELD

The present invention relates to a hybrid power conversion system, and, in particular embodiments, to a hybrid dual-phase step-up power conversion system.

BACKGROUND

As technologies further advance, a variety of portable devices, such as mobile phones, tablet PCs, digital cameras, MP3 players and/or the like, have become popular. Batteries provide power for various high voltage applications such as display backlights, audio amplifiers, piezoelectric haptic actuators and the like. For example, each portable device may comprise a Liquid Crystal Display (LCD). The LCD does not emit light by itself. The LCD needs a backlight to provide illumination so as to produce a visible image. The backlight may be formed by a plurality of light-emitting diodes (LEDs). Each LED typically requires 3.3 V to emit light. Depending on the number of the LEDs, the backlight may need a supply voltage up to 20 V. A boost converter may be coupled between a power source (e.g., a battery) and a high voltage load (e.g., a backlight comprising a plurality of LEDs). The boost converter is configured to convert a source voltage (e.g., the output voltage of a battery cell) to a level (e.g., 20 V) suitable for driving the plurality of LEDs.

A conventional boost converter comprises a switching element, a blocking device, an energy storage element and an output filter. The switching element may be implemented as a metal-oxide-semiconductor field-effect transistor (MOSFET). The blocking device may be implemented as a diode. The energy storage element may be implemented as an inductor. The output filter may be implemented as a capacitor. The diode and the MOSFET are connected in series across the capacitor. The inductor is coupled between an input power source and the common node of the diode and the MOSFET transistor. The conventional boost converter is used to provide an output voltage higher than an input voltage from the input power source by modulating the width of a pulse applied to the MOSFET.

In the portable device, the power source may be implemented as a single-cell battery. In order to achieve an output voltage approximately equal to 20 V, the step-up ratio of the conventional boost converter should be 1:4 or higher. Such a high step-up ratio makes it more difficult to achieve the desired efficiency using the conventional boost converter.

A cascaded power conversion system may be employed to achieve better efficiency. The cascaded power conversion system comprises a boost converter and a charge pump converter connected in cascade. The boost converter can adjust its output voltage by varying the duty cycle of the boost converter. The charge pump converter is able to achieve a step-up ratio of 1:2.

FIG. 1 illustrates a single-phase step-up power conversion system. The single-phase step-up power conversion system 100 comprises an input capacitor 101, an input inductor 102, power switches 103, 104, 105, 106, a first capacitor 107, a second capacitor 108, an output capacitor 109 and a single-phase step-up controller 120. The power switches 103-106 are connected in series between an output terminal Vo and ground. The input capacitor 101 is connected between an input terminal VIN and ground. The input inductor 102 is connected between VIN and a common node of switches 103 and 104. The first capacitor 107 is connected between a common node of switches 105 and 106, and the common node of switches 103 and 104. The second capacitor 108 is connected between a common node of switches 104 and 105, and ground. The single-phase step-up controller 120 is configured to generate gate drive signals applied to the gates of switches 103-106, respectively.

In FIG. 1, the input capacitor 101, the input inductor 102, power switches 103, 104 and the second capacitor 108 form a boost converter. The capacitors 107-109 and power switches 103-106 form a 1:2 step-up charge pump converter. Since the output voltage across the output capacitor 109 is equal to twice of the voltage across the second capacitor 108, which is also the output voltage of the boost converter, the output voltage Vo of the single-phase step-up power conversion system 100 is at least two times higher than the input voltage VIN.

FIG. 2 illustrates gate drive signals associated with the single-phase step-up power conversion system shown in FIG. 1. As shown in FIG. 2, power switches 103 and 105 are turned on (e.g., from t1 to t2) and off (e.g., from t2 to t3) at the same time. Likewise, power switches 104 and 106 are on and off at the same time. In addition, power switches 103 and 104 operate in a complimentary manner. Likewise, power switches 105 and 106 operate in a complimentary manner. By varying the duty cycle of power switch 103, the output voltage can be more than twice of the input voltage. For example, the duty cycle is 50%, the output voltage is four times of the input voltage. It should be noted that in a conventional boost converter, a duty cycle of 50% results in an output voltage equal to twice of the input voltage. Furthermore, with the same output voltage, a higher duty cycle of power switch 103 results in a lower root mean square (RMS) current and power dissipation, thereby achieving higher efficiency. One disadvantage of the single-phase step-up power conversion system shown in FIG. 1 is that ripple currents of capacitors 101, 108, and 109 are high, resulting additional power losses in these capacitors. To reduce the power dissipation of these capacitors, a dual-phase step-up power conversion system is used.

FIG. 3 illustrates a dual-phase step-up power conversion system. The dual-phase step-up power conversion system 200 comprises an input capacitor 201, a first input inductor 211, a second input inductor 221, power switches 212, 213, 214, 215, power switches 222, 223, 224, 225, a first capacitor 216, a second capacitor 217, a third capacitor 202, an output capacitor 203 and a dual-phase step-up controller 230.

The power switches 212-215 are connected in series between an output terminal Vo and ground. The power switches 222-225 are connected in series between an output terminal Vo and ground. The input capacitor 201 is connected between an input terminal VIN and ground. The first input inductor 211 is connected between VIN and a common node of switches 213 and 212. The first capacitor 216 is connected between a common node of switches 215 and 214, and the common node of switches 213 and 212. The second input inductor 221 is connected between VIN and a common node of switches 223 and 222. The second capacitor 217 is connected between a common node of switches 225 and 224, and the common node of switches 223 and 222. The third capacitor 202 is connected between a common node of switches 214 and 213, and ground. The common node of switches 224 and 223 is connected to the common node of switches 214 and 213. The dual-phase step-up controller 230 is configured to generate gate drive signals applied to the gates of switches 212-215 and switches 222-225, respectively.

In FIG. 3, the input capacitor 201, the first input inductor 211, power switches 213, 212 and the third capacitor 202 form a first boost converter. The capacitors 202, 216, 203 and power switches 212-215 form a first 1:2 step-up charge pump. The first boost converter and the first 1:2 step-up charge pump form a first phase of the dual-phase step-up power conversion system 200. The input capacitor 201, the second input inductor 221, power switches 223, 222 and the third capacitor 202 form a second boost converter. The capacitors 202, 217, 203 and power switches 222-225 form a second 1:2 step-up charge pump. The second boost converter and the second 1:2 step-up charge pump form a second phase of the dual-phase step-up power conversion system 200. In FIG. 3, capacitors 201, 202, and 203 are shared between the two boost converters and the two 1:2 step-up charger pumps.

FIG. 4 illustrates gate drive signals associated with the dual-phase step-up power conversion system shown in FIG. 3. The operating principle of the power switches in FIG. 4 is similar to that shown in FIG. 2 except that the two phases shown in FIG. 4 are configured to be out of phase from each other. For example, the switch 212 of the first phase is turned on from a first time instant t1 and a second time instant t2. By employing the out of phase control, the corresponding switch of the second phase (e.g., switch 222) is turned on from a third time instant t3 and a fourth time instant t4. Likewise, the switch 212 is turned off from the second time instant t2 and a fifth time instant t5. Switch 222 is turned off from the fourth time instant t4 and a sixth time instant t6. The out of phase control results in cancellation of ripple currents in capacitors 201, 202, and 203, thereby reducing the power dissipation in these capacitors.

Although better efficiency can be achieved with the dual-phase step-up power conversion system shown in FIG. 3, there are eight power switches and five capacitors in the dual-phase step-up power conversion system. The eight power switches need a large silicon area and many external components.

As power consumption has become more important, there may be a need for simplifying the dual-phase step-up power conversion system shown in FIG. 3. More particularly, the dual-phase step-up power conversion system having eight power switches and five capacitors is not cost-effective. It is desirable to have a simplified system to perform the functions of the dual-phase step-up power conversion system described above with respect to FIG. 3-4.

SUMMARY

These and other problems are generally solved or circumvented, and technical advantages are generally achieved, by preferred embodiments of the present disclosure which provide a hybrid dual-phase step-up power conversion system.

In accordance with an embodiment, a hybrid dual-phase step-up power conversion system comprises a first leg comprising a first switch, a second switch and a third switch connected in series between an output terminal of the hybrid dual-phase step-up power conversion system and ground, a second leg comprising a fourth switch, a fifth switch and a sixth switch connected in series between the output terminal of the hybrid dual-phase step-up power conversion system and ground, and a first capacitor and a second capacitor cross-coupled between the first leg and the second leg, wherein switches of the first leg and switches of the second leg are configured such that a sum of a voltage across the first capacitor and a voltage across the second capacitor is fed into the output terminal of the hybrid dual-phase step-up power conversion system.

In accordance with another embodiment, a method comprises providing a hybrid dual-phase step-up power conversion system comprising a first leg and a second leg comprising a plurality of switches, a first capacitor and a second capacitor cross-coupled between the first leg and the second leg, in a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground, wherein the first capacitor is connected to ground, and in a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground, wherein the second capacitor is connected to ground.

In accordance with yet another embodiment, a system comprises a first leg comprising a first switch, a second switch and a third switch connected in series between an output terminal of the system and ground, a second leg comprising a fourth switch, a fifth switch and a sixth switch connected in series between the output terminal of the system and ground, a first inductor connected between an input terminal of the system and a common node of the second switch and the third switch, a second inductor connected between the input terminal of the system and a common node of the fifth switch and the sixth switch, a first capacitor connected between a common node of the fourth switch and the fifth switch, and a common node of the second switch and the third switch, and a second capacitor connected between a common node of the first switch and the second switch, and a common node of the fifth switch and the sixth switch.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid dual-phase step-up power conversion system. The invention may also be applied, however, to a variety of power systems. Hereinafter, various embodiments will be explained in detail with reference to the accompanying drawings.

Figure 1:
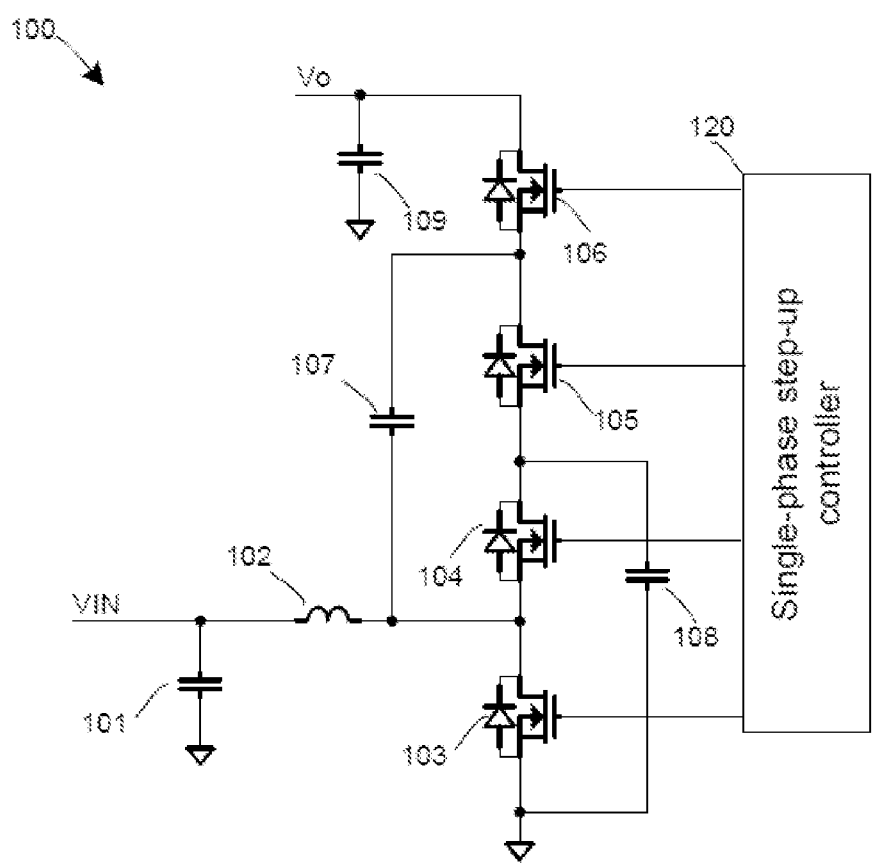
FIG. 1 illustrates a single-phase step-up power conversion system.
Figure 2:
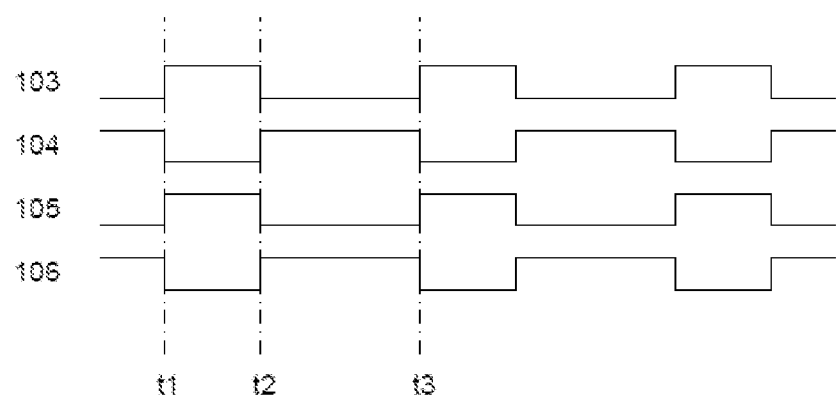
FIG. 2 illustrates gate drive signals associated with the single-phase step-up power conversion system shown in FIG. 1.
Figure 3:
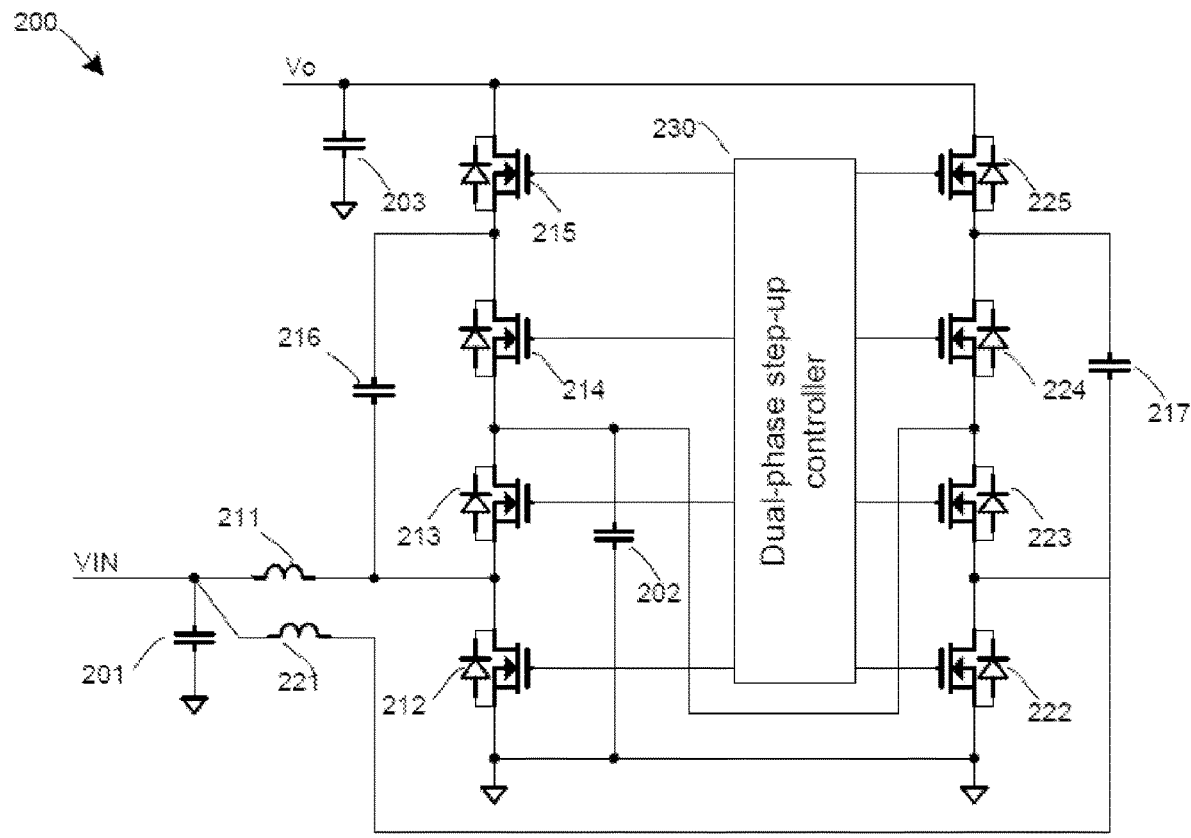
FIG. 3 illustrates a dual-phase step-up power conversion system.
Figure 4:
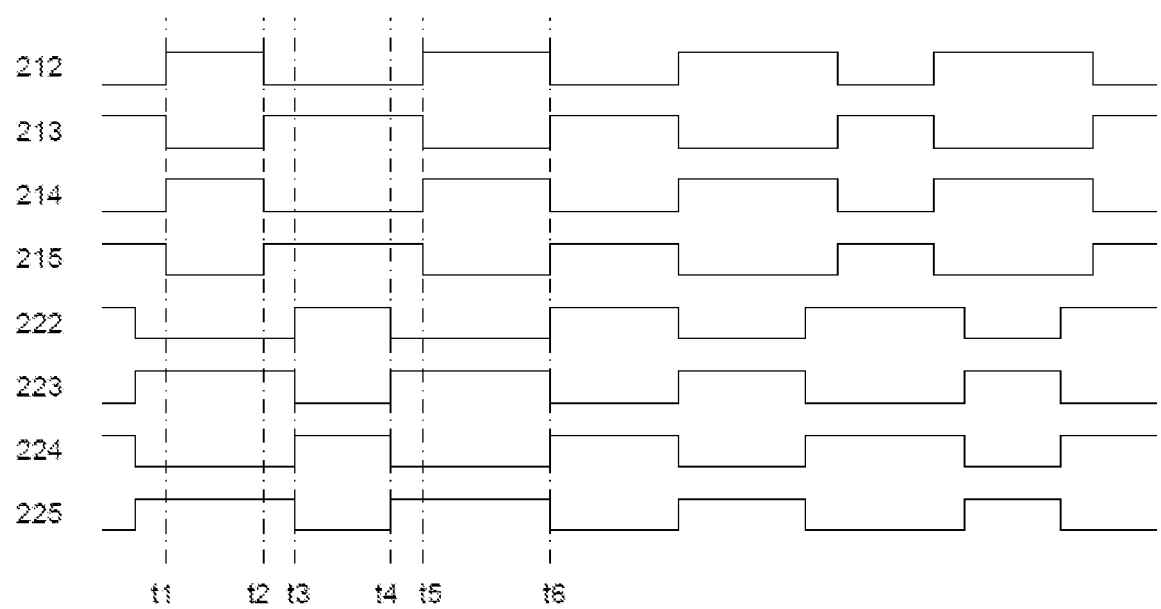
FIG. 4 illustrates gate drive signals associated with the dual-phase step-up power conversion system shown in FIG. 3.
Figure 5:
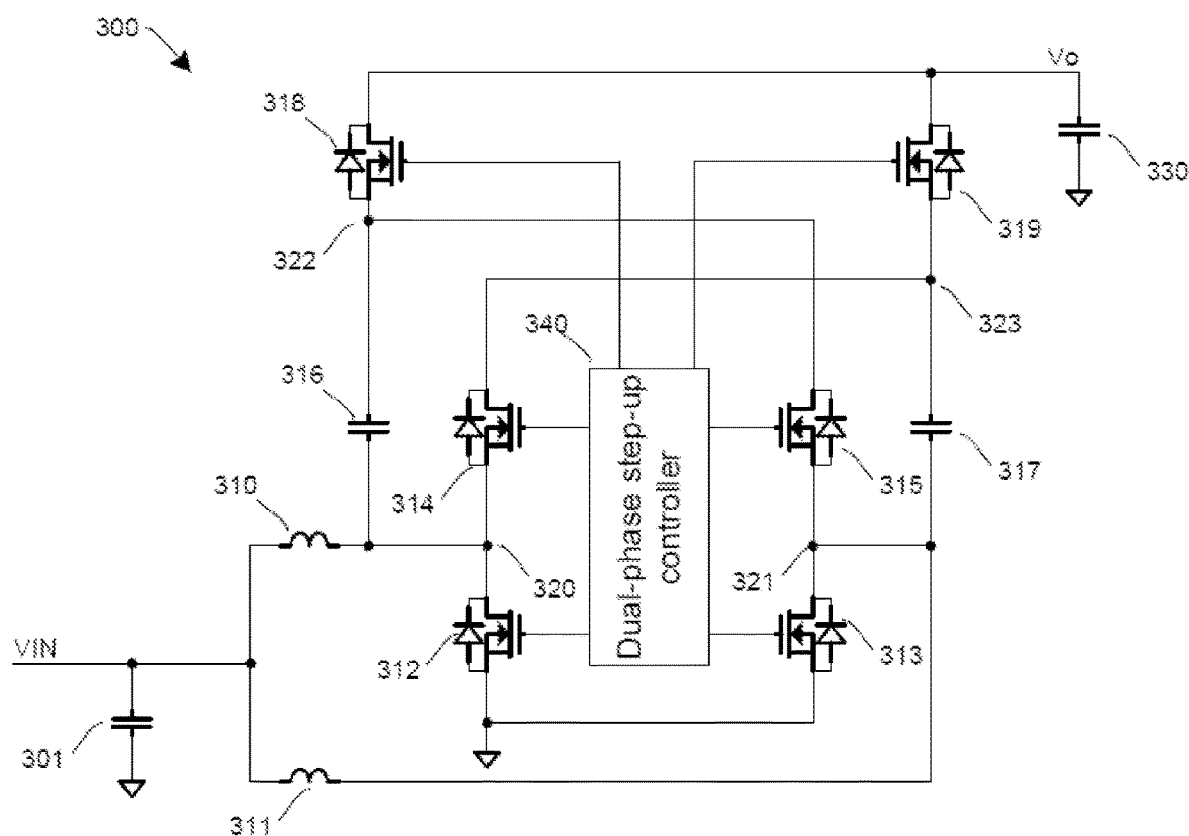
FIG. 5 illustrates a schematic diagram of a hybrid dual-phase step-up power conversion system in accordance with various embodiments of the present disclosure.

FIG. 5 illustrates a schematic diagram of a hybrid dual-phase step-up power conversion system in accordance with various embodiments of the present disclosure. The hybrid dual-phase step-up power conversion system 300 comprises an input capacitor 301, a first inductor 310, a second inductor 311, a first switch 319, a second switch 314, a third switch 312, a fourth switch 318, a fifth switch 315, a sixth switch 313, a first capacitor 316, a second capacitor 317 and an output capacitor 330. The hybrid dual-phase step-up power conversion system 300 further comprises a dual-phase step-up controller 340. The dual-phase step-up controller 340 is employed to generate suitable gate drive signals for controlling the switches 312, 313, 314, 315, 318 and 319.

The hybrid dual-phase step-up power conversion system 300 comprises two legs. A first leg comprises the first switch 319, the second switch 314 and the third switch 312 connected in series between an output terminal Vo and ground. A second leg comprises the fourth switch 318, the fifth switch 315 and the sixth switch 313 connected in series between the output terminal Vo and ground. As shown in FIG. 5, node 323 is a common node of the first switch 319 and the second switch 314. Node 320 is a common node of the second switch 314 and the third switch 312. Node 322 is a common node of the fourth switch 318 and the fifth switch 315. Node 321 is a common node of the fifth switch 315 and the sixth switch 313.

The first inductor 310 is connected between an input terminal VIN and node 320. The second inductor connected between VIN and node 321. The first capacitor 316 and the second capacitor 317 are cross-coupled between the first leg and the second leg. More particularly, the first capacitor 316 is connected between nodes 322 and 320. The second capacitor 317 is connected between nodes 323 and 321.

In some embodiments, the first inductor 310, the second switch 314, the third switch 312, the second inductor 311, the fifth switch 315, the sixth switch 313, the first capacitor 316 and the second capacitor 317 form a boost converter stage of the hybrid dual-phase step-up power conversion system 300. As shown in FIG. 5, the first inductor 310, the second switch 314, the third switch 312 and the second capacitor 317 form a first boost converter. The second inductor 311, the fifth switch 315, the sixth switch 313 and the first capacitor 316 form a second boost converter. On the other hand, the first switch 319, the second switch 314, the third switch 312, the fourth switch 318, the fifth switch 315, the sixth switch 313, the first capacitor 316 and the second capacitor 317 form a charge pump stage of the hybrid dual-phase step-up power conversion system 300. As shown in FIG. 5, the first switch 319, the second switch 314 and the third switch 312 form a first phase of the hybrid dual-phase step-up power conversion system 300. The fourth switch 318, the fifth switch 315 and the sixth switch 313 form a second phase of the hybrid dual-phase step-up power conversion system 300. The first capacitor 316 functions as a first flying capacitor. The second capacitor 317 functions as a second flying capacitor.

It should be noted many components shown in FIG. 5 are shared by the two stages of the hybrid dual-phase step-up power conversion system 300. These shared components help to reduce the total number of switches and capacitors in the hybrid dual-phase step-up power conversion system 300, thereby reducing the cost and improving the reliability of the hybrid dual-phase step-up power conversion system 300.

In operation, the second switch 314 and the third switch 312 are controlled by a first pair of complementary drive signals. The fifth switch 315 and the sixth switch 313 are controlled by a second pair of complementary drive signals. Drive signals of the third switch 312 and the sixth switch 313 are 180 degrees out of phase from each other. In some embodiments, the third switch 312 and the sixth switch 313 are configured to operate with a 50% duty cycle. Under the 50% duty cycle, an output voltage of the hybrid dual-phase step-up power conversion system 300 is four times greater than an input voltage of the hybrid dual-phase step-up power conversion system. In alternative embodiments, for adjusting the output voltage of the hybrid dual-phase step-up power conversion system, the third switch 312 and the sixth switch 313 may be configured to operate with a duty cycle in a range from 50% to 100%. The output voltage may be adjusted through varying the duty cycle.

In operation, switches of the first leg and switches of the second leg are configured such that a sum of a voltage across the first capacitor 316 and a voltage across the second capacitor 317 is fed into the output terminal of the hybrid dual-phase step-up power conversion system 300. More particularly, when the duty cycle is equal to 50%, the hybrid dual-phase step-up power conversion system 300 is configured to operate in two different operating modes. In a first operating mode, the third switch 312, the fifth switch 315, the first switch 319 are configured to be turned on, and the second switch 314, the sixth switch 313, the fourth switch 318 are configured to be turned off. In the first operating mode, the first capacitor 316 functions as an output capacitor of a boost converter stage of the hybrid dual-phase step-up power conversion system. The second capacitor 317 and the first capacitor 316 are connected in series between an output of the hybrid dual-phase step-up power conversion system and ground.

In a second operating mode, the third switch 312, the fifth switch 315, the first switch 319 are configured to be turned off, and the second switch 314, the sixth switch 313, the fourth switch 318 are configured to be turned on. In the second operating mode, the second capacitor 317 functions as an output capacitor of the boost converter stage of the hybrid dual-phase step-up power conversion system. The first capacitor 316 and the second capacitor 317 are connected in series between an output of the hybrid dual-phase step-up power conversion system and ground.

Furthermore, when the duty cycle is in a range from 50% to 100%, the hybrid dual-phase step-up power conversion system 300 is configured to operate in three different operating modes. The first two modes are similar to those described above, and hence are not discussed again to avoid repetition. In a third operating mode of the hybrid dual-phase step-up power conversion system, the third switch 312 and the sixth switch 313 are configured to be turned on, and the first switch 319, the second switch 314, the fourth switch 318 the fifth switch 315 are configured to be turned off. In the third operating mode, the first capacitor 316 and the second capacitor 317 are floating. The detailed description of these three operating modes will be described below with respect to FIGS. 6-9.

In accordance with an embodiment, the switches of FIG. 5 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 5 shows the switches (e.g., switch 312) are implemented as single n-type transistors, a person skilled in the art would recognize there may be many variations, modifications and alternatives. For example, depending on different applications and design needs, all or at least some of the switches may be implemented as p-type transistors. Furthermore, each switch shown in FIG. 5 may be implemented as a plurality of switches connected in parallel. Moreover, a capacitor may be connected in parallel with one switch to achieve zero voltage switching (ZVS)/zero current switching (ZCS).

Figure 6:
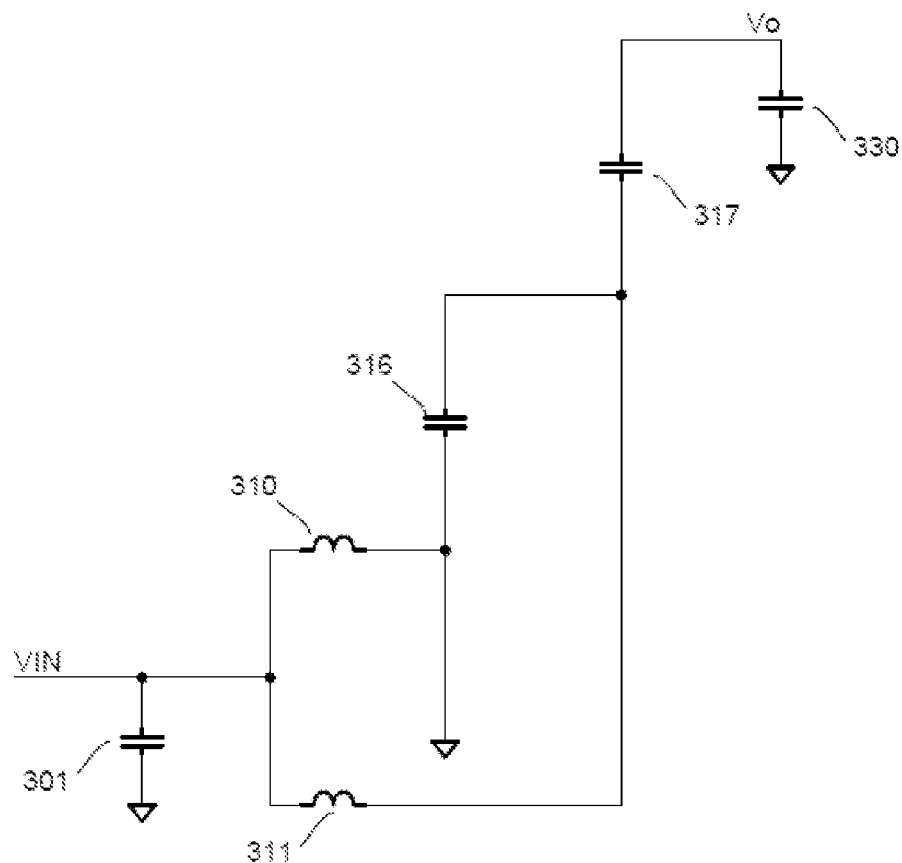
FIG. 6 illustrates an equivalent circuit of a first operating mode of the dual-phase step-up power conversion system shown in FIG. 5 in accordance with various embodiments of the present disclosure.
Figure 7:
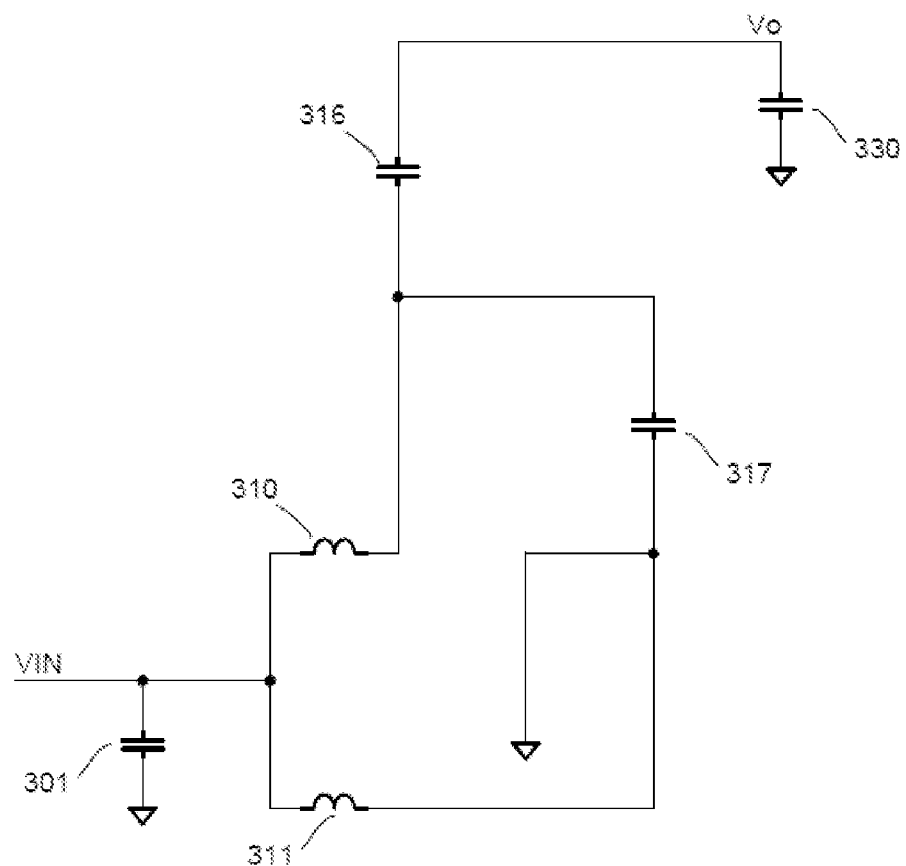
FIG. 7 illustrates an equivalent circuit of a second operating mode of the dual-phase step-up power conversion system shown in FIG. 5 in accordance with various embodiments of the present disclosure.
Figure 8:
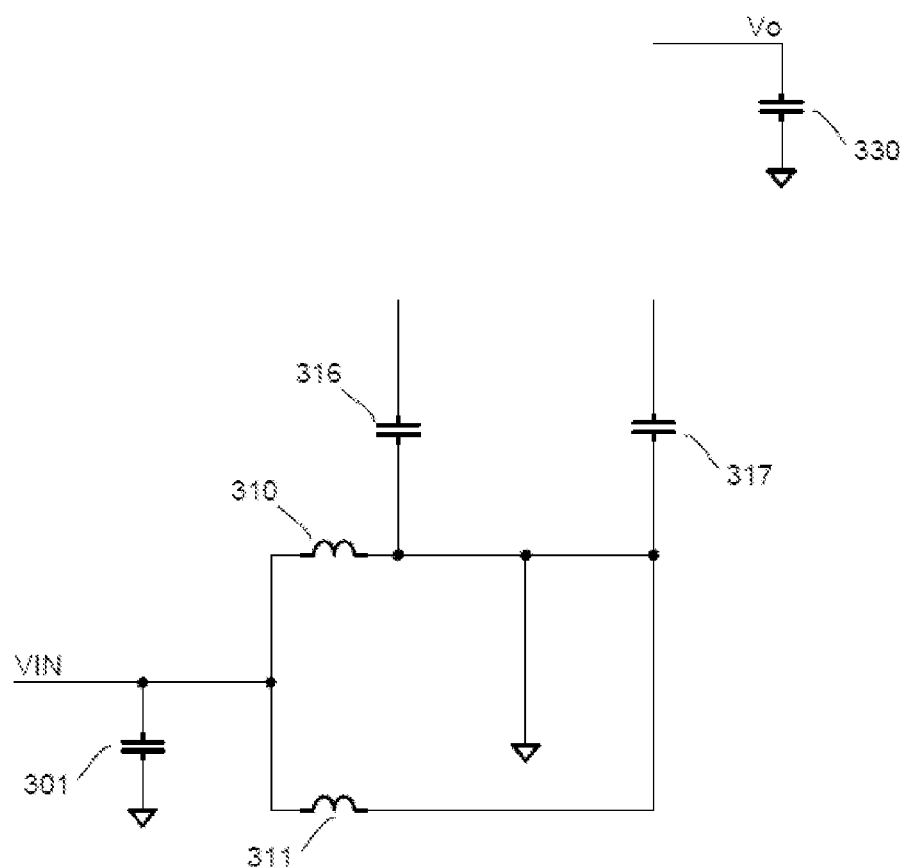
FIG. 8 illustrates an equivalent circuit of a third operating mode of the dual-phase step-up power conversion system shown in FIG. 5 in accordance with various embodiments of the present disclosure.

FIGS. 6-8 illustrate the three operating modes of the dual-phase step-up power conversion system shown in FIG. 5. To aid understanding and clarity, only the components relevant to this discussion are shown in FIGS. 6-8. Furthermore, the respective switches are shown as simple conductors (straight lines) when the switches are in the on state, and the respective switches are shown as open circuits when the switches are in the off state.

FIG. 6 illustrates an equivalent circuit of a first operating mode of the dual-phase step-up power conversion system shown in FIG. 5 in accordance with various embodiments of the present disclosure. In the first operating mode, the third switch 312, the fifth switch 315 and the first switch 319 are turned on, and the second switch 314, the sixth switch 313 and the fourth switch 318 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the fifth switch 315, the second inductor 311 is connected to the first capacitor 316. The current flowing through the second inductor 311 is fed into the first capacitor 316, and the energy stored in the second inductor 311 is deposited into the first capacitor 316.

Referring back to FIG. 5, in some embodiments, the third switch 312 and the sixth switch 313 operate with a duty cycle of 50%. Under this duty cycle, the average voltage across the first capacitor 316 is twice the voltage of the input voltage (VIN). The first capacitor 316 and the second capacitor 317 function as output capacitors of the second boost converter (formed by components 311, 313 and 315) and the first boost converter (formed by components 310, 312 and 314) respectively. These two boost converters are configured to operate in a symmetrical manner. Because of symmetry, the average voltage across the first capacitor 316 is equal to that of the second capacitor 317.

In response to the turn-on of the fifth switch 315 and the first switch 319, the second capacitor 317 is connected in series with the first capacitor 316 between the output terminal Vo and ground. The voltage across the series combination of the two capacitors is twice that of each individual capacitor or four times that of the input voltage (VIN).

FIG. 7 illustrates an equivalent circuit of a second operating mode of the dual-phase step-up power conversion system shown in FIG. 5 in accordance with various embodiments of the present disclosure. In the second operating mode, the third switch 312, the fifth switch 315 and the first switch 319 are turned off, and the second switch 314, the sixth switch 313 and the fourth switch 318 are turned on.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-on of the second switch 314, the first inductor 310 is connected to the second capacitor 317. The current flowing through the first inductor 310 is fed into the second capacitor 317, and the energy stored in the first inductor 310 is deposited into the second capacitor 317. In some embodiments, the third switch 312 and the sixth switch 313 operate with a duty cycle of 50%. Under this duty cycle, the average voltage across the second capacitor 317 is twice the voltage of the input VIN.

In response to the turn-on of the second switch 314 and the fourth switch 318, the first capacitor 316 is connected in series with the second capacitor 317 between the output terminal Vo and ground. The voltage across the series combination of the two capacitors is twice that of each individual capacitor or four times that of the input VIN.

FIG. 8 illustrates an equivalent circuit of a third operating mode of the dual-phase step-up power conversion system shown in FIG. 5 in accordance with various embodiments of the present disclosure. In the third operating mode, the third switch 312 and the sixth switch 313 are turned on, and the first switch 319, the second switch 314, the fourth switch 318 and the fifth switch 315 are turned off.

In response to the turn-on of the third switch 312, the node 320 is connected to ground. The input voltage is applied to the first inductor 310. The current flowing through the first inductor 310 increases. In response to the increased current, the energy stored in the first inductor 310 increases accordingly.

In response to the turn-on of the sixth switch 313, the node 321 is connected to ground. The input voltage is applied to the second inductor 311. The current flowing through the second inductor 311 increases. In response to the increased current, the energy stored in the second inductor 311 increases accordingly.

In response to the turn-off of the first switch 319, the second switch 314, the fourth switch 318 and the fifth switch 315, the first capacitor 316 and the second capacitor 317 are floating as shown in FIG. 8.

Figure 9:
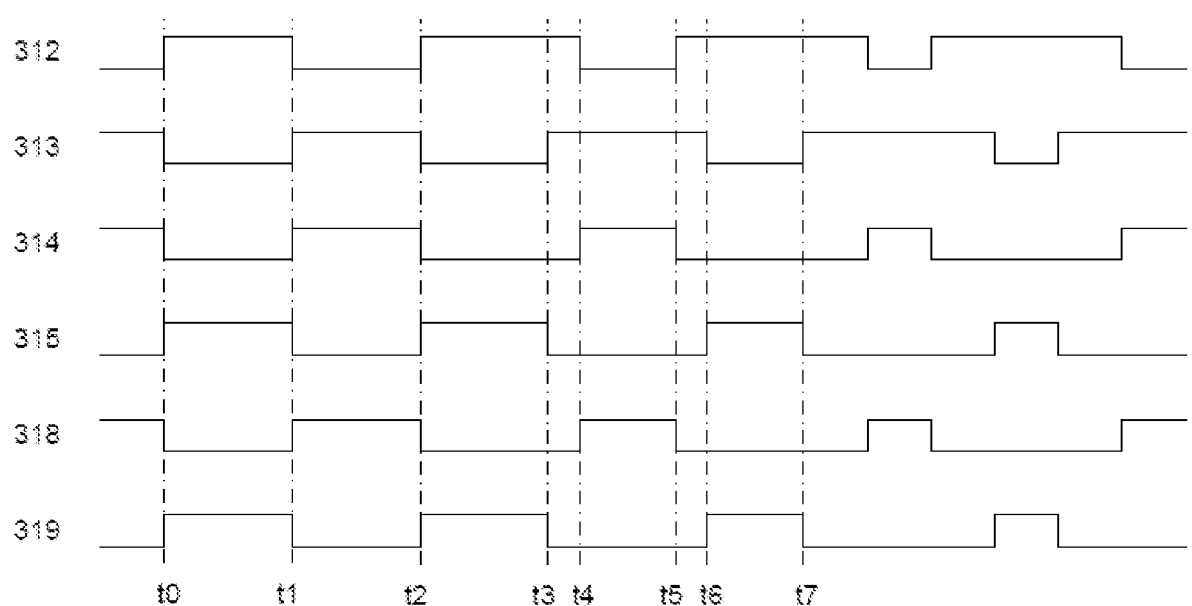
FIG. 9 illustrates gate drive signals associated with the dual-phase step-up power conversion system shown in FIG. 5 in accordance with various embodiments of the present disclosure.

FIG. 9 illustrates gate drive signals associated with the dual-phase step-up power conversion system shown in FIG. 5 in accordance with various embodiments of the present disclosure. Referring back to FIG. 5, the dual-phase step-up controller 340 is configured to generate the gate drive signals for switches 312, 313, 314, 315, 318 and 319. In some embodiments, the duty cycle of the switches 312 and 313 is in a range from 50% to 100%. As shown in FIG. 9, from t0 to t2, the switches 312 and 314 operate in a complementary manner. Switches 313 and 315 operate in a complementary manner. The gate drive signals of switches 312 and 314 are 180 degrees out of phase from each other. The switch 318 is in synchronization with the switch 314. The switch 319 is in synchronization with the switch 315.

From t0 to t2, the switches 312 and 313 operate with a duty cycle of 50%. The step-up ratio of the dual-phase step-up power conversion system is 1:4. The switches 312 and 313 can operate at a duty cycle greater than 50% to increase the step-up ratio up to a level greater than 1:4. In some embodiments, the dual-phase step-up controller 340 senses the output voltage Vo, and adjusts the duty cycle (from 50% to 100%) in a closed loop manner to achieve tight regulation of the dual-phase step-up power conversion system. The detailed operating principle of configuring the switches 312 and 313 to operate at a duty cycle greater than 50% will be discussed below.

From t2 to t3, the switch 312 is turned on and the switch 314 is turned off for a first time period corresponding to a duty cycle greater than 50%. The first time period is defined as DT. From t4 to t5, the switch 312 is turned off and the switch 314 is turned on for a second time period corresponding to one minus the duty cycle. The second time period is defined as T-DT. The phase difference between t2 and t3 is 180 degrees. From t3 to t6, the switch 313 is turned on and the switch 315 is turned off for a time period equal to DT. From t6 to t7, the switch 313 is turned off and the switch 315 is turned on for a time period equal to T-DT. The gate drive signal of the switch 318 is in synchronization with the gate drive signal of the switch 314 Likewise, the gate drive signal of the switch 319 is in synchronization with the gate drive signal of the switch 315.

Referring back to FIG. 6, the first operating mode shown in FIG. 6 corresponds to the switch configuration shown from t2 to t3 or from t0 to t1. Based on this switch configuration, the second capacitor 317 is connected in series with the first capacitor 316 between the output terminal Vo and ground.

Referring back to FIG. 7, the second operating mode shown in FIG. 7 corresponds to the switch configuration shown from t4 to t5 or from t1 to t2. Based on this switch configuration, the first capacitor 316 is connected in series with the second capacitor 317 between the output terminal Vo and ground.

Referring back to FIG. 8, the third operating mode shown in FIG. 8 corresponds to the switch configuration shown from t3 to t4. The time period from t3 to t4 is equal to DT-(T/2). Based on this switch configuration, the first capacitor 316 and the second capacitor 317 are floating. In particular, capacitors 316 and 317 are not connected in series, but are both switched to ground on one terminal and are unconnected on the other terminal. In addition, inductors 310 and 311 are both switched to ground on one terminal.

It should be noted that in the third operating mode (from t3 to t4), the charge pump stage is not active. Switches 318 and 319 are turned off to prevent discharging of the output capacitor 330.

It should further be noted that the switches 312 and 313 may operate with a duty cycle less than 50%. When the duty cycle is less than 50%, the dual-phase step-up controller 340 may create an operating mode in which switches 314 and 315 are simultaneously turned on. In response to the turn-on of switches 314 and 315, the capacitors 316 and 317 are connected in antiparallel. Such an antiparallel connection discharges the capacitors 316 and 317.

Figure 10:
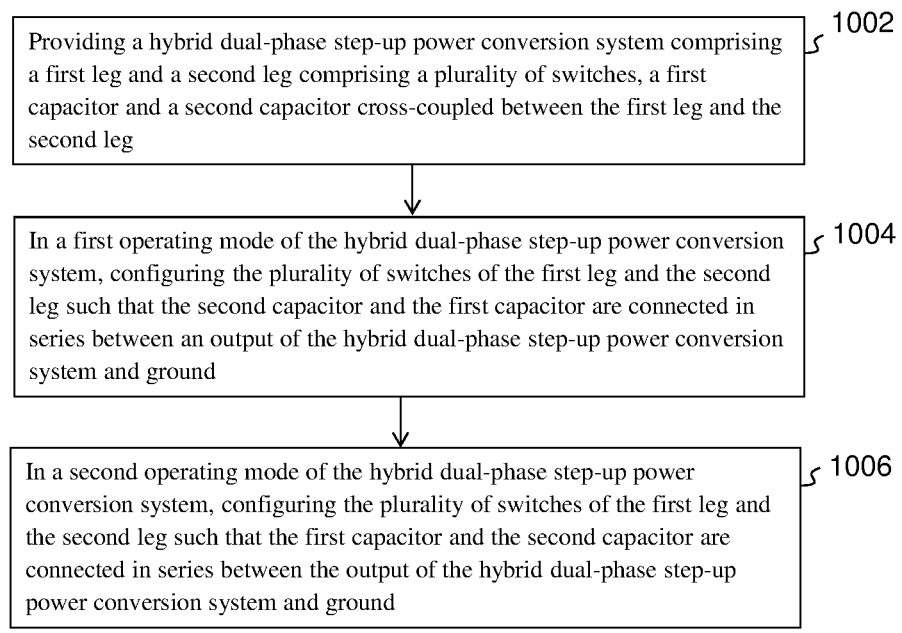
FIG. 10 illustrates a flow chart of a control method for the dual-phase step-up power conversion system shown in FIG. 5 in accordance with various embodiments of the present disclosure.

FIG. 10 illustrates a flow chart of a control method for the dual-phase step-up power conversion system shown in FIG. 5 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

A hybrid dual-phase step-up power conversion system comprises a boost converter stage and a charge pump stage. The boost converter stage and the charge pump stage share a plurality of switches and capacitors. When the boost converter stage operates with a duty cycle equal to 50%, the dual-phase step-up power conversion system is configured to operate in two different operating modes. The step-up ratio of the dual-phase step-up power conversion system is 1:4. When the boost converter stage operates with a duty cycle greater than 50%, the dual-phase step-up power conversion system is configured to operate in three different operating modes. The step-up ratio is greater than 1:4.

At step 1002, a hybrid dual-phase step-up power conversion system is provided to convert an input voltage to an output voltage higher than the input voltage. The hybrid dual-phase step-up power conversion system comprises a first leg and a second leg. Both legs comprise a plurality of switches. The system further comprises a first capacitor and a second capacitor cross-coupled between the first leg and the second leg. In some embodiments, the hybrid dual-phase step-up power conversion system is implemented as the system shown in FIG. 5.

At step 1004, in a first operating mode of the hybrid dual-phase step-up power conversion system, the plurality of switches of the first leg and the second leg is configured such that the second capacitor and the first capacitor are connected in series between an output of the hybrid dual-phase step-up power conversion system and ground.

At step 1006, in a second operating mode of the hybrid dual-phase step-up power conversion system, the plurality of switches of the first leg and the second leg is configured such that the first capacitor and the second capacitor are connected in series between the output of the hybrid dual-phase step-up power conversion system and ground.

Figure 11:
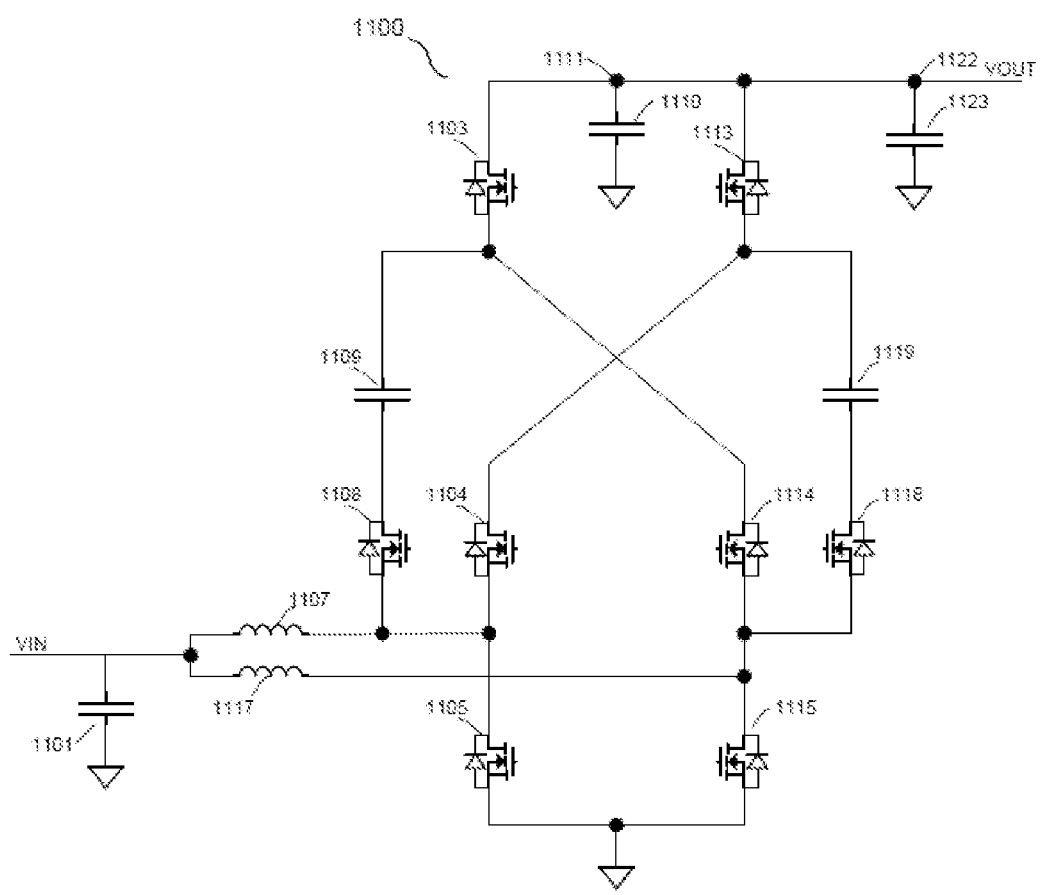
FIG. 11 illustrates a schematic diagram of another hybrid dual-phase step-up power conversion system in accordance with various embodiments of the present disclosure.

FIG. 11 illustrates a schematic diagram of another hybrid dual-phase step-up power conversion system in accordance with various embodiments of the present disclosure. The hybrid dual-phase step-up power conversion system 1100 comprises switches 1103, 1104, 1105, 1108, 1113, 1114, 1115 and 1118, capacitors 1101, 1109, 1119, 1110 and 1123, and inductors 1107 and 1117. The structure and operating principle of the hybrid dual-phase step-up power conversion system 1100 are similar to those of the hybrid dual-phase step-up power conversion system 300 shown in FIG. 5 except that switches 1108 and 1118 are employed to further improve the performance of the hybrid dual-phase step-up power conversion system. In particular, the hybrid dual-phase step-up power conversion system 1100 may be configured as a dual-phase boost conversion system through turning off the switches 1108 and 1118. The dual-phase boost configuration of the system (turning off switches 1108 and 1118) may be alternatively referred to as a bypass mode of the hybrid dual-phase step-up power conversion system 1100. The dual-phase boost conversion system is well known in the art, and hence is not discussed in detail to avoid repetition.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hybrid dual-phase step-up power conversion system comprising:
    a first leg comprising a first switch, a second switch and a third switch connected in series between an output terminal of the hybrid dual-phase step-up power conversion system and ground;
    a second leg comprising a fourth switch, a fifth switch and a sixth switch connected in series between the output terminal of the hybrid dual-phase step-up power conversion system and ground; and
    a first capacitor and a second capacitor cross-coupled between the first leg and the second leg, wherein two terminals of the first capacitor are connected to the first leg and the second leg, respectively, and two terminals of the second capacitor are connected to the first leg and the second leg, respectively, wherein switches of the first leg and switches of the second leg are configured such that a sum of a voltage across the first capacitor and a voltage across the second capacitor is fed into the output terminal of the hybrid dual-phase step-up power conversion system.

2. The hybrid dual-phase step-up power conversion system of claim 1, further comprising:
    a first inductor connected between an input terminal of the hybrid dual-phase step-up power conversion system and a common node of the second switch and the third switch; and
    a second inductor connected between the input terminal of the hybrid dual-phase step-up power conversion system and a common node of the fifth switch and the sixth switch.

3. The hybrid dual-phase step-up power conversion system of claim 2, wherein:
    the first inductor, the second switch, the third switch, the second inductor, the fifth switch, the sixth switch, the first capacitor and the second capacitor form a boost converter stage of the hybrid dual-phase step-up power conversion system; and
    the first switch, the second switch, the third switch, the fourth switch, the fifth switch, the sixth switch, the first capacitor and the second capacitor form a charge pump stage of the hybrid dual-phase step-up power conversion system.

4. The hybrid dual-phase step-up power conversion system of claim 1, wherein:
    the first capacitor is connected between a common node of the fourth switch and the fifth switch, and a common node of the second switch and the third switch; and
    the second capacitor is connected between a common node of the first switch and the second switch, and a common node of the fifth switch and the sixth switch.

5. The hybrid dual-phase step-up power conversion system of claim 1, wherein:
    the second switch and the third switch are controlled by a first pair of complementary drive signals; and
    the fifth switch and the sixth switch are controlled by a second pair of complementary drive signals.

6. The hybrid dual-phase step-up power conversion system of claim 1, wherein:
    the third switch and the sixth switch are configured to operate with a 50% duty cycle, and wherein an output voltage of the hybrid dual-phase step-up power conversion system is four times greater than an input voltage of the hybrid dual-phase step-up power conversion system.

7. The hybrid dual-phase step-up power conversion system of claim 1, wherein:
    in a first operating mode of the hybrid dual-phase step-up power conversion system, the third switch, the fifth switch, the first switch are configured to be turned on, and the second switch, the sixth switch, the fourth switch are configured to be turned off, and wherein:
        in the first operating mode, the first capacitor functions as an output capacitor of a boost converter stage of the hybrid dual-phase step-up power conversion system; and
        the second capacitor and the first capacitor are connected in series between the output terminal of the hybrid dual-phase step-up power conversion system and ground.

8. The hybrid dual-phase step-up power conversion system of claim 1, wherein:
in a second operating mode of the hybrid dual-phase step-up power conversion system, the third switch, the fifth switch, the first switch are configured to be turned off, and the second switch, the sixth switch, the fourth switch are configured to be turned on, and wherein:
in the second operating mode, the second capacitor functions as an output capacitor of a boost converter stage of the hybrid dual-phase step-up power conversion system; and
the first capacitor and the second capacitor are connected in series between the output terminal of the hybrid dual-phase step-up power conversion system and ground.

9. The hybrid dual-phase step-up power conversion system of claim 1, wherein:
in a third operating mode of the hybrid dual-phase step-up power conversion system, the third switch and the sixth switch are configured to be turned on, and the first switch, the second switch, the fourth switch the fifth switch are configured to be turned off, and wherein in the third operating mode, the first capacitor and the second capacitor are floating.

10. The hybrid dual-phase step-up power conversion system of claim 1, further comprising:
an input capacitor coupled between an input terminal of the hybrid dual-phase step-up power conversion system and ground;
an output capacitor coupled between the output terminal of the hybrid dual-phase step-up power conversion system and ground; and
a controller configured to generate drive signals for the switches of the first leg and the second leg.

11. A method comprising:
providing a hybrid dual-phase step-up power conversion system comprising a first leg and a second leg comprising a plurality of switches, a first capacitor and a second capacitor cross-coupled between the first leg and the second leg, wherein two terminals of the first capacitor are connected to the first leg and the second leg, respectively, and two terminals of the second capacitor are connected to the first leg and the second leg, respectively;
in a first operating mode of the hybrid dual-phase step-up power conversion system, configuring the plurality of switches of the first leg and the second leg such that the second capacitor and the first capacitor are connected in series between an output of the hybrid dual-phase step-up power conversion system and ground, wherein the first capacitor is connected to ground; and
in a second operating mode of the hybrid dual-phase step-up power conversion system, configuring the plurality of switches of the first leg and the second leg such that the first capacitor and the second capacitor are connected in series between the output of the hybrid dual-phase step-up power conversion system and ground, wherein the second capacitor is connected to ground.

12. The method of claim 11, wherein the hybrid dual-phase step-up power conversion system comprises:
the first leg comprising a first switch, a second switch and a third switch connected in series between the output of the hybrid dual-phase step-up power conversion system and ground;
the second leg comprising a fourth switch, a fifth switch and a sixth switch connected in series between the output of the hybrid dual-phase step-up power conversion system and ground;
a first inductor connected between an input of the hybrid dual-phase step-up power conversion system and a common node of the second switch and the third switch;
a second inductor connected between the input of the hybrid dual-phase step-up power conversion system and a common node of the fifth switch and the sixth switch;
the first capacitor is coupled between a common node of the fourth switch and the fifth switch, and a common node of the second switch and the third switch; and
the second capacitor is coupled between a common node of the first switch and the second switch, and a common node of the fifth switch and the sixth switch.

13. The method of claim 12, further comprising:
in a third operating mode of the hybrid dual-phase step-up power conversion system, turning on the third switch and the sixth switch, turning off the first switch, the second switch, the fourth switch and the fifth switch, and configuring the first capacitor and the second capacitor as floating capacitors.

14. The method of claim 12, further comprising:
in the first operating mode of the hybrid dual-phase step-up power conversion system, turning on the third switch, the fifth switch, the first switch, and turning off the second switch, the sixth switch, the fourth switch, and wherein in the first operating mode, the first capacitor functions as an output capacitor of a boost converter stage of the hybrid dual-phase step-up power conversion system.

15. The method of claim 12, further comprising:
in the second operating mode of the hybrid dual-phase step-up power conversion system, turning off the third switch, the fifth switch, the first switch, and turning on the second switch, the sixth switch, the fourth switch, wherein in the second operating mode, the second capacitor functions as an output capacitor of a boost converter stage of the hybrid dual-phase step-up power conversion system.

16. The method of claim 12, further comprising:
configuring the second switch, the third switch, the fifth switch and the sixth switch to operate with a 50% duty cycle, and wherein:
the second switch and the third switch operate in a complementary manner;
the fifth switch and the sixth switch operate in the complementary manner;
the fourth switch is in synchronization with the second switch;
the first switch is in synchronization with the fifth switch; and
drive signals of the third switch and the sixth switch are 180 degrees out of phase from each other.

17. The method of claim 12, further comprising:
configuring the third switch and the sixth switch to operate with a duty cycle in a range from 50% to 100%, and wherein:
the second switch and the third switch operate in a complementary manner;
the fifth switch and the sixth switch operate in the complementary manner;
the fourth switch is in synchronization with the second switch;

the first switch is in synchronization with the fifth switch; and drive signals of the third switch and the sixth switch are 180 degrees out of phase from each other.

18. The method of claim 12, further comprising:

a first auxiliary switch connected in series with the first capacitor between the common node of the fourth switch and the fifth switch, and the common node of the second switch and the third switch; and a second auxiliary switch connected in series with the second capacitor between the common node of the first switch and the second switch, and the common node of the fifth switch and the sixth switch, wherein the first auxiliary switch and the second auxiliary switch are configured such that the hybrid dual-phase step-up power conversion system is configured as a dual-phase boost conversion system.

19. A system comprising:

a first leg comprising a first switch, a second switch and a third switch connected in series between an output terminal of the system and ground;

a second leg comprising a fourth switch, a fifth switch and a sixth switch connected in series between the output terminal of the system and ground;

a first inductor connected between an input terminal of the system and a common node of the second switch and the third switch;

a second inductor connected between the input terminal of the system and a common node of the fifth switch and the sixth switch;

a first capacitor connected between a common node of the fourth switch and the fifth switch, and a common node of the second switch and the third switch; and a second capacitor connected between a common node of the first switch and the second switch, and a common node of the fifth switch and the sixth switch.

20. The system of claim 19, wherein:

in a first operating mode of the system, the third switch, the fifth switch, the first switch are configured to be turned on, and the second switch, the sixth switch, the fourth switch are configured to be turned off, and wherein:

in the first operating mode, the first capacitor functions as an output capacitor of a boost converter stage of the system; and a sum of a voltage across the second capacitor and a voltage across the first capacitor is fed into the output terminal of the system; and in a second operating mode of the system, the third switch, the fifth switch, the first switch are configured to be turned off, and the second switch, the sixth switch, the fourth switch are configured to be turned on, and wherein:

in the second operating mode, the second capacitor functions as an output capacitor of a boost converter stage of the system; and a sum of a voltage across the first capacitor and a voltage across the second capacitor is fed into the output terminal of the system.

* * * * *